Aug. 14, 1951

O. B. JACOBS 2,564,010

UNATTENDED REPEATER TESTING BY CAUSING THE REPEATERS TO OSCILLATE

Filed July 7, 1947

INVENTOR
O. B. JACOBS
BY N. D. Ewing
ATTORNEY

Patented Aug. 14, 1951 2,564,010

UNITED STATES PATENT OFFICE 2,564,010

UNATTENDED REPEATER TESTING BY CAUSING THE REPEATERS TO OSCILLATE

Oliver B. Jacobs, Morristown, N. J., assignor to Bell Telephone Laboratories, Incorporated, New York, N. Y., a corporation of New York Application July 7, 1947, Serial No. 759,320

9 Claims. (Cl. 179—175.31)

This invention relates in general to the testing of repeaters in repeatered electrical transmission systems. More particularly, it relates to the identification and test of faulty repeaters in a repeatered submarine cable signaling system.

In the servicing of extended submarine or buried electrical transmission systems, difficulty arises in detecting and locating faulty repeaters which are inaccessible for the application of ordinary test techniques. Moreover, in order that the repeaters may be replaced as soon as their performance begins to deteriorate, and before a complete breakdown occurs in the transmission system, it is desirable to provide for the routine testing of the respective repeaters at regular intervals.

It is therefore the primary object of the present invention to provide for the testing of repeaters from the terminals of a repeatered electrical transmission system in a simpler and more expedient manner than provided heretofore.

In accordance with the present invention, the repeaters in an electrical transmission system are caused to oscillate briefly at respectively different frequencies and/or for respectively different intervals in response to a signal transmitted from the terminal or other control station. By a process of elimination repeaters which fail to oscillate normally may be readily identified at a detecting unit located at one of the control stations of the system which is responsive to the different repeater oscillating frequencies.

In accordance with one feature of the invention, each repeater is provided with circuit means under control of current transmitted over the line from a terminal station, for conditioning the repeater to oscillate at a predetermined frequency.

A second feature of the invention provides for a limitation in the intensity of the oscillations in the respective repeater circuits so that the repeater continues to serve as a satisfactory amplifier of other frequencies, whereby the oscillations from preceding repeaters can be effectively transmitted through the repeater.

In accordance with another feature of the invention, the respective repeaters are arranged to oscillate one at a time in succession, in the event that it is not possible to confine the oscillating activities of the respective repeaters to frequency bands narrow enough to permit effective amplification of other frequencies.

In accordance with a further feature of the invention, in a system in which oscillation in the respective repeaters is controlled in response to changes in the energizing current transmitted over the line to the repeaters, auxiliary circuits are arranged in the respective repeaters so that only a momentary interruption of the energizing current is necessary to cause the respective repeaters to oscillate thereafter for a substantial time interval.

Another advantageous feature of the present invention is that the equipment added to the transmission system in accordance therewith does not necessitate the placing of any additional contacts in the main transmission path.

By way of illustration, certain specific embodiments of the present invention are described herein as applied to a repeatered submarine cable system. In the embodiments described the respective repeater circuits are provided with relays, which have their windings connected in series with the cathode heater circuits, and which are designed to respond to a momentary interruption in the operating current to establish a feedback circuit in each repeater. The feedback circuits are tuned to oscillate at respectively different frequencies. Once established, the feedback circuits are maintained in operation for a substantial period, the duration of which may be controlled in the respective repeater circuits by adjustments in the operate and release times of the aforementioned relays. At one of the cable terminals, each of a plurality of detecting and indicating circuits is selectively tuned to a different corresponding repeater frequency.

In accordance with one embodiment of the invention, the relay in each of the respective repeater circuits takes the form of an electromagnet having a break contact which is connected to a tuned feedback circuit, the magnet being so characterized that it is quick to actuate but slow to release its armatures, thereby providing for self-oscillation of the repeater during the period of release.

In accordance with a second embodiment, the slow-release characteristics of the relay circuit are secured by shunting the windings of a magnetic relay with a thermally operated relay having a normally closed contact in series with its windings. Thus, when the current is restored to the energizing circuit immediately after an interruption, a large proportion of the current flows through the thermal relay, whereby the armatures of the magnetic relay remain unoperated. After a suitable period, the thermal contacts open, thereby removing the shunt and causing the magnetic relay to operate its armatures.

In accordance with a modified form of the second embodiment, the magnetic relay is provided with a so-called "bucking" winding which is placed in parallel with the winding of a thermal relay, but in series with the contacts thereof, which serve to shunt the magnetic winding. Premature operation of the magnetic relay is prevented by the opposing field of the bucking winding.

Another modified form of the second embodiment provides for the short-circuiting of the winding of the magnetic relay during the time required for the thermal relay to open its contacts. This has the advantage of providing more power to operate the thermal relay.

Other objects, features, and advantages of the present invention will be apparent from a study of the detailed description set forth hereinafter, and the drawing, in which.

For the purposes of illustration, the present invention will be described as specifically adapted for use in an extended under-sea cable system for the transmission of speech and telegraph signals. However, it will be apparent that the principles of this invention may be applied to electrical transmission systems of other types and constructions; and that the practice of this invention is not limited to the particular system or the particular apparatus and electromechanical structures disclosed herein.

Figures 1A, 1B, 1C, 2B, 2C:
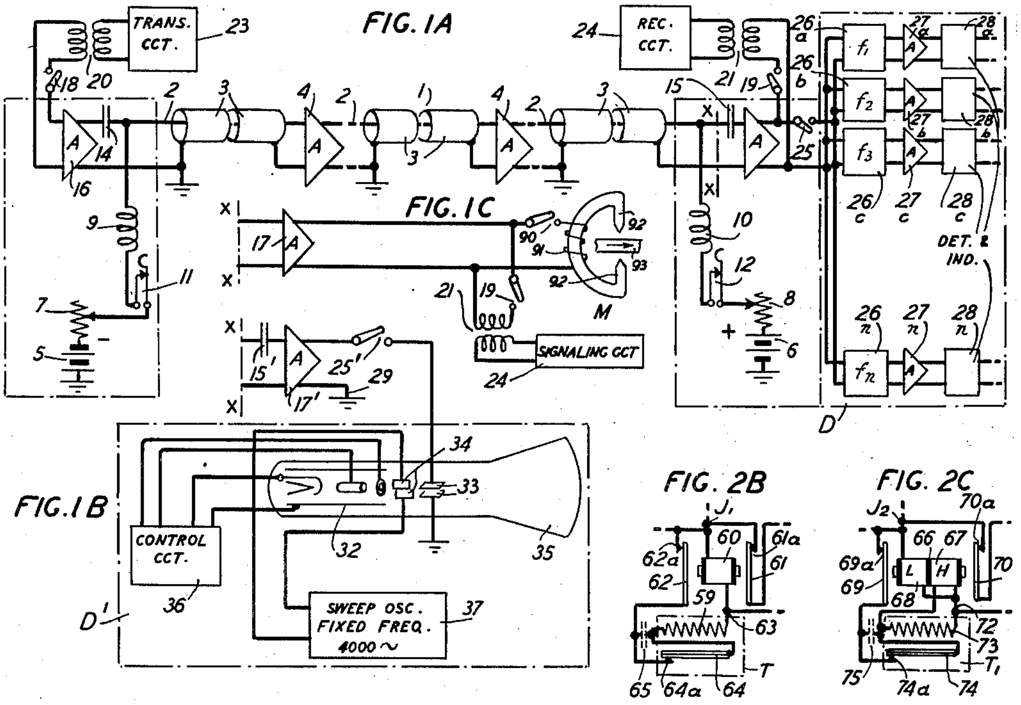
Fig. 1A shows a repeatered submarine cable system provided with test equipment in accordance with the present invention.
Fig. 1B shows a cathode-ray tube detecting unit D' which can be substituted to the right of the line $x—x$ in place of the detecting unit D shown in Fig. 1A.
Fig. 1C shows a conventional magnetic recording unit which may be alternatively connected to the right of the line $x—x$ to receive the output of the cable system.
Fig. 2B shows a modified form of the relay circuit R of Fig. 2A, in which the magnetic relay is shunted by a thermally operated relay.
Fig. 2C shows a modification of the relay circuit R shown in Fig. 2B in which an auxiliary opposing winding is utilized on the magnetic relay.

Fig. 1A of the drawings discloses an extended submarine cable system including a large number of repeaters which are subject to test in accordance with the teachings of the present invention. In structural detail, the submarine cable system shown in Fig. 1A may be assumed to be broadly similar to the system disclosed in United States Patent No. 2,020,297 granted November 12, 1935 to O. E. Buckley et al. In normal operation of the signaling system of Fig. 1A, signals from the transmitting circuit 23 are conducted through the transmission system comprising the cable 1 and the included vacuum-tube repeater stations 4 to the receiving circuit 24.

In addition, Fig. 1A discloses a test system in accordance with the present invention, operation of which is initiated by depressing either one or both of the switches 11 and 12 to cause a brief interruption in the direct current which is conducted along the cable 1 to feed the energizing circuits in the vacuum tubes of the repeaters 4. Restoration of the energizing current after such interruption actuates delayed-release relays in each of the repeaters 4 to connect feed-back circuits for self-oscillation, whereby each of the repeaters is caused to oscillate for a brief interval at a different preselected frequency. The different frequency signals from the respective repeaters are conducted over the cable system to a detecting circuit D at one of the cable terminals, where they are detected for identification.

Referring in detail to Fig. 1A, the submarine cable 1 comprises a plurality of sections, each having an inner conductor 2 and a concentric grounded outer conductor 3, which are connected in series through the repeater stations 4, details of which are shown schematically in Figs. 2A–2D of the drawing, which will be described hereinafter.

The cathode heater circuits in the repeater stations 4 are connected in series with the inner cable conductors 2. Energizing current for the heater circuits is derived at the western cable terminal from the direct current source 7, the negative terminal of which is connected to the inner cable conductor 2 through the adjustable rheostat 7 or other suitable current regulating device and the choke coil 9; and energizing current is derived at the eastern cable terminal from the direct current source 6, the positive terminal of which is connected to the inner conductor 2 through the adjustable rheostat 8 and the choke coil 10. The switches 11 and 12, respectively connected in series with the energizing circuits at the western and eastern cable terminals, provide for interruption and restoration of the energizing current at the will of the operators at the respective terminals.

Although Fig. 1A shows the respective power sources 5 and 6 at each of the cable terminals, the system would operate satisfactorily with a single source having double the potential located at either one of the terminals.

While speech and telegraph signals are transmitted over the cable system during normal operation, the switch 18 at the western cable terminal, and the switch 19 at the eastern cable terminal are in closed positions. The switch 25 at the eastern cable terminal is in open circuit position disconnecting detecting unit D.

The output of the signaling circuit 23, which may comprise, for example, a conventional speech and/or telegraph signal transmitting circuit, is impressed between the central conductor 2 and the grounded outer conductor 3 of the cable 1 through a circuit which includes the transformer 20, the conventional amplifying circuit 16, and the blocking condenser 14. At the eastern cable terminal the output signals from the cable 1 are fed into the signaling circuit 24, which may comprise, for example, a conventional speech and/or telegraph signal receiving circuit, through a circuit which includes the blocking condenser 15, the amplifier 17, and the transformer 21.

Figure 2A:
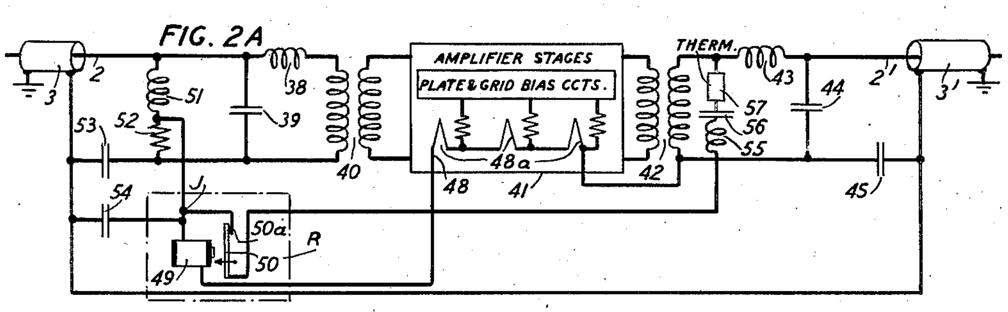
Fig. 2A shows a typical repeater circuit 4 of the transmission system shown in Fig. 1A, including a detailed showing of a relay response circuit R in accordance with the present invention.

Attention will now be directed to Fig. 2A of the drawing, which shows detailed circuit arrangements at a typical one of the repeater stations 4 of Fig. 1A, including in particular a relay circuit R which is responsive to interruptions in the repeater energizing current to connect a tuned feedback circuit, whereby the respective repeater is caused to oscillate for a brief interval. Discussion of the detecting circuit D of Fig. 1A, and the alternative detecting circuit D′, shown in Fig. 1B, will be deferred to a subsequent portion of the specification.

The amplifier stages 41 of the typical repeater circuit shown in Fig. 2A, may be assumed to be substantially similar in circuit detail to the disclosure of Fig. 2 in my Patent 2,342,544, issued February 22, 1944.

Incoming signals arriving at a particular repeater station from the western cable terminal are conducted from the central cable conductor 2 through a broadly tuned circuit which includes the parallel connected condenser 39 and the inductance 38 connected in series to the primary winding of the transformer 40. The circuit to ground for the primary winding of transformer 40 and the condenser 39 is completed through the condenser 53 which is connected to the grounded outer cable conductor 3. From the secondary winding of the transformer 40, the incoming signals are fed into the amplifier circuit 41, which may be assumed to comprise three stages. The amplified output current from the circuit 41 passes from the primary to the secondary winding of the transformer 42, and through a broadly tuned circuit including the series connected inductance 43 and the parallel connected condenser 44 to the central cable conductor 2′ which conducts the output currents in the direction of the eastern cable terminal. The condenser 45 connected to the grounded outer cable conductor 3′ serves to complete the circuit to ground from the secondary winding of the transformer 42 and from the condenser 44.

Cathodes of the amplifier tubes 41 are energized by heater elements 48*a* connected in series in the energizing circuit 48, one terminal of which is connected to the outgoing central conductor 2′ through the secondary winding of transformer 42, and the other terminal of which is connected to the incoming central cable conductor 2 through an intervening circuit which includes the relay circuit R in series therewith, and which will now be described in detail. Plate and grid-biasing potentials for the amplifier stages are also derived from the energizing circuit 48 in a manner fully described in my Patent 2,342,544 cited hereinbefore.

The relay 49 is a non-polar magnetic type having one terminal of its windings connected to the last-mentioned terminal of heater circuit 48, and is so designed that the armature 50 responsive thereto is slow to pull away from the break contact 50*a*, but quick to release when remaking engagement with contact 50*a*. In order to minimize the heat dissipated by the magnet during normal system operation, its resistance should be relatively low. For example, assuming a maximum system energizing current of about 260 milliamperes, the power dissipated in the winding of each of the relays 49 should not be greater than of the order of 2 watts, in which case the resistance of the individual relay windings should not exceed 30 ohms.

The choke coil 51 connected between the other terminal of the windings of relay 49 and the central cable conductor 2 furnishes a path for direct current to pass through the windings of relay 49 to the heater circuit 48.

The armature 50 and contact 50*a* of the relay 49 serve to close a feedback circuit connected between the output and input circuits of the amplifier stages 4. The feedback circuit, which at one end is connected to the high potential terminal of the secondary winding of the output transformer 42, includes the inductance coil 55 and the condenser 56 in series with the thermistor 57, which functions to prevent overloading of the circuit during oscillation. The inductance 55 and condenser 56 provide a tuned circuit which determines the frequency of self-oscillation in each repeater circuit. The constants of the respective tuned circuits comprising inductance 55 and condenser 56 are so valued as to produce oscillations at a different identifying frequency in each of the respective repeater circuits 4. These elements are connected in series with the armature and contact 50—50*a* to the junction 55 between the choke coil 51 and the resistance 52, which provides a path for the alternating current feedback to pass through the transformer 40 into the input circuit of the amplifier stages 41. An additional path for the feedback current is provided by the condenser 54 connected to ground. This arrangement permits operation of the thermistor 57 at a convenient value of current, and the diversion to ground of the excess current over the amount required for sustaining self-oscillation of the repeater circuit 4.

During normal operation of the submarine signaling system shown in Fig. 1A, the relay 49 in each of the respective repeater circuits is energized, attracting its armature 50, and thereby disconnecting the feedback circuit.

Referring again to Fig. 1A of the drawings, one may assume that the system is to be placed in condition for testing in accordance with the present invention. The switch 18 at the western cable terminal is open-circuited, thereby disconnecting the signaling circuit 23 from the cable circuit. Likewise, the switch 19 at the eastern cable terminal is open-circuited, thereby disconnecting the signaling circuit 24 from the cable circuit. The switch 25, also at the eastern cable terminal, is closed, thereby connecting for operation the detecting circuit D, comprising a plurality of substantially identical parallel circuits, each of which includes a conventional filter circuit 26*a*, . . . 26*n*, an amplifier 27*a*, . . . 27*n*, and a conventional detector 28*a*, . . . 28*n*, which may include an indicator, such as, for example, a milliammeter.

The filtering circuits 26*a*, . . . 26*n* are conventional band-pass filters, each one of which corresponds in frequency to a respective one of the self-oscillating frequencies of the repeaters 4, which are adjusted in the respective repeater circuits by suitable choice of the values of the inductance 55 and the condenser 56 in the feedback circuit.

When it is desired to make a test, the switch 11 at the western cable terminal and the switch 12 at the eastern cable terminal are depressed synchronously and immediately released, whereby simultaneously in each of the repeaters of the system the repeater energizing current in circuit 48 is interrupted and immediately restored.

It will be apparent to those skilled in the art that the system of the present invention will operate in response to current interruptions brought about by other methods than the disclosed switch operation, e. g., a gradual reduction and subsequent increase in the potential of either of the sources 7 or 8.

This interruption and restoration of current causes the relays 49 in each of the repeater circuits 4 to be deenergized briefly, whereby the armatures 50 are quickly released to engage the contacts 50*a*, thus connecting the feedback circuits in each of the respective repeaters and thereby causing the repeaters to break into self-oscillation, each at the predetermined frequency which is a function of the constants in the respective feedback circuits. Since the energizing current interruption is only momentary, the respective relays 49 are again energized after a brief interval, slowly operating their armatures 50 to break the contacts 50*a*, thereby disconnecting the feedback circuits in each of the repeaters 4. Self-oscillation in the repeater circuits therefore occurs during that brief interval in which the relay 49 is delayed in attracting its armature 50 after the energizing current has been restored.

Preferably, the repeaters should be designed to give normal gains at frequencies removed from that of their oscillating tone. However, if this cannot be accomplished readily, the duration of the interval of oscillation for repeaters located progressively farther from the receiving terminal can be made progressively greater by designing the different relays 49 to operate after respectively different periods of delay, so that each particular relay releases its armatures for a different brief period than the other relays. For example all of the relays may be designed so that their intervals of operation begin at the same instant and end in staggered time relation or, alternatively, both begin and end in staggered time relation. This may be brought about by equipping the relays with copper yokes of various designs and by other devices well known in the relay art.

The different frequency signals which are thus transmitted along the cable 1 by oscillation in the respective repeater circuits 4 are each detected in the circuit of corresponding frequency response included in the detecting unit D at the eastern cable terminal. Data can thus be recorded on the frequencies of the received signals, the sequence in which they arrive, and their relative volumes. Thus, if a particular repeater fails to oscillate, its location can readily be determined from the fact that its identifying signal is missing in the detector unit.

In addition to locating repeaters which completely fail to pass signals, the system of the present invention can be utilized to perform other tests. For example, if the volume of the oscillations of each repeater is regulated to a fixed value, the volume of the respective received tones will serve as a measure of the attenuation between the repeater which originates the tone and the receiving station.

Measurement of modulation products of the various combinations of tones from the respective repeaters will provide means for determining a particular point along the system at which abnormal modulation may be occurring. For example, assume that the repeaters, taken in order from the transmitting end of the system, are adapted to oscillate at frequencies $f_1$, $f_2$, . . . $f_n$. If the signals received at the detecting unit include one or more signals involving various combinations of $f_1$ with $f_2$, this may be assumed to indicate that non-linear transmission is taking place either in the repeater adapted to oscillate at a frequency of $f_2$ or in some other repeater on the output side of the latter. The signals received at the detecting unit will include modulation product frequencies of all combinations of the frequencies at which repeaters oscillate, up to and including the one at which abnormal modulation takes place.

A further test to determine which repeaters have become impaired in performance is provided by adjusting the rheostats 7 and 8 to reduce the energizing current below normal for a short period immediately preceding and immediately following interruption by the respective switches 11 and 12, the tones and modulation products received during such operation being compared with those produced when the energizing current is normal.

It is not necessary, in accordance with the present invention, that all of the repeaters in a long system be equipped with the auxiliary feedback circuit hereinbefore described. For example, if response circuits are provided at only a few of the repeater points, this enables the approximate location of the troubled repeater, which is sufficient, particularly if cable ships are equipped with auxiliary fault-locating devices which will enable further locational tests to be made without cutting or raising the main cable.

It is estimated that a system in accordance with the present invention will require an increased terminal potential of somewhat less than 10 volts for every repeater so equipped. For example, in a transatlantic system containing 44 repeaters, the addition of the described equipment at every third repeater in the first two-thirds of the system would require that 10 repeaters be equipped, involving a total increase of 50 volts or less in the potentials impressed at the terminal stations.

If, for example, the cable is designed to operate with a connection to ground in the energizing current path of the mid-point repeater, such as disclosed in Fig. 3 of my application Serial No. 687,428, filed July 31, 1946, the two cable halves may then be tested independently without the necessity of synchronizing the operation of the switches 11 and 12 at the cable terminals. Otherwise, such synchronization is desirable in order that portions of the cable system normally operating at one polarity to ground may not be subjected to the opposite polarity or to larger voltages of either polarity.

It will be apparent to those skilled in the art that a system for locating faulty repeaters, within the scope of the present invention, may assume forms quite unlike that of Fig. 1A, hereinbefore described, and may include components which are structurally different than the component apparatus described with reference to Figs. 1A and 2B.

For example, the detecting circuit D shown in Fig. 1A and described with reference thereto may be replaced by a detecting circuit D′ including a cathode-ray oscilloscope such as shown in Fig. 1B of the drawings, to the right of the line *x*–*x* in Fig. 1A. The cathode-ray oscilloscope 31 is entirely conventional, and comprises an electron gun 32 including an electron emitting cathode and conventional focussing anodes, designed to produce a pencil-shaped beam of electrodes which impinges on the fluorescent screen 35 disposed in the end of the enclosing glass envelope. The elements of the electron gun 32 are maintained at the necessary potentials by connection to a conventional control circuit 36. The vertical motion of the beam on the screen 35 is controlled by the electrostatic deflecting plates 33, one of which is connected to ground, and the other of which is connected through the condenser 15' and amplifier 17' to receive the output of the central conductor 2 of the cable 1. The horizontal sweep of the beam is controlled by the electrostatic deflecting plates 34, which are connected to the output of the conventional sweep frequency oscillator 37, which is adapted in a manner well known in the art to produce a saw-tooth wave of a fixed frequency which may be, for example, 4,000 cycles per second. The ground 29 is connected directly to the outer cable conductor 3.

If the respective repeaters 4 are tuned to oscillate at frequencies which are integral multiples of the sweep frequency of the oscillator 37, for example, 12,000, 16,000, 20,000 cycles, then the respective received test signals may be identified by the number of complete repetitious patterns, such as sine waves, which appear on the screen. Thus, a measure of each repeater performance is had by observing the intensity and wave form of the pattern thereby produced on the indicator screen 35; and the failure of a repeater to oscillate may be easily detected by the absence of its identifying signal.

In accordance with another modification, the detecting unit D at the receiving end of the system may be replaced by a conventional magnetic recording unit M such as shown in Fig. 1C of the drawings.

Referring to Fig. 1C, which is assumed to be a continuation of Fig. 1A to the right of the line *x–x*, the amplifier 17, connected to the receiving terminals of the cable 1, has its ouput connected across a conventional magnetic recording unit M, which includes the energizing winding 91 mounted on a horseshoe-shaped iron core 92, between the poles of which is passed a recording tape 93, comprising a magnetic material such as steel. For further details of the magnetic recording device M which is entirely conventional, the reader is referred to an article by C. N. Hickman entitled "Magnetic Recording and Reproducing," Bell Laboratories Record, September 1937, vol. XVI, No. 1, pg. 2.

The single-throw switch 90, in series with the circuit of the magnetic recording unit M, permits it to be included in the cable output circuit at the will of an operator.

Assume that a test observation is to be made during a routine interruption in the normal transmission of speech and telegraph signals. The switch 90 is closed; and the switch 19 is also closed to include the normal signal receiving circuit 24, such as described with reference to Fig. 1A, in parallel with the magnetic recorder M at the output terminals of the amplifier 17. Immediately after the energizing current has been interrupted by means of switches 11 and 12, as described hereinbefore, the resultant different frequency signals from the respective test repeaters are recorded on the moving magnetic tape 93, while speech and telegraph signals may be received in the usual manner in the signal receiving circuit 24 without further interruption. The received repeater signals may be studied at any convenient time by passing the section of the tape 93 on which they have been recorded through a conventional magnetic reproducing unit, the output from which might be analyzed by means of a detecting circuit D, such as shown in Fig. 1A described above.

At the repeater stations 4, another component of a system in accordance with the present invention which may take numerous forms is the relay circuit R, one form of which was shown and described with reference to Fig. 2A. The circuit R of Fig. 2A may be replaced by a circuit, such as shown in Fig. 2B, in which the slow-acting relay characteristics are obtained by placing a thermal relay in shunt with a magnetic relay.

Referring to Fig. 2B, the relay 60 is a conventional non-polar magnetic type having one end of its windings connected to the junction $J_1$ corresponding to the junction J of Fig. 2A, and the other end of its windings connected in series to the heater circuits 48, through the junction 63. Responsive to the magnetic relay 60, are the right-hand and left-hand armatures 61 and 62 which are adapted to respectively break engagement with contacts 61*a* and 62*a* when the relay 60 is energized. The armature and contacts 61 and 61*a* are adapted to connect the junction $J_1$ to the feedback circuit including inductance 55, condenser 56, and thermistor 57 as shown in Figs. 2A. The armature and contacts 62 and 62*a* close the circuit leading through a thermal relay T connected in shunt across the windings of the magnetic relay 60. The thermal relay T which is a type well known in the art comprises the normally closed thermally responsive armature and contacts 64 and 64*a* which are connected in series with the thermal winding 59, one terminal of which is connected to the junction 63. The thermal winding 59 is disposed in such relationship to the contacts 64—64*a*, that passage of current therethrough for a predetermined period causes the contacts 64—64*a* to open, thus removing the shunt across the windings of the magnetic relay 60. If, for example, the winding of the magnetic relay 60 has a resistance of the order of 30 ohms, the thermal relay T, in order to be an effective shunt, would preferably have a resistance of not more than 6–8 ohms. In order to prevent sparking, the condenser 65 may be connected across the armature and contact 64—64*a*.

When the switches 11 and 12 are simultaneously depressed in the system of Fig. 1A, as described hereinbefore, thus interrupting heater energizing current, the magnet 60 becomes deenergized, releasing the armatures 61 and 62, thereby simultaneously connecting the feedback circuit and the shunt through the thermal relay T. When the energizing current is reestablished in the system of Fig. 1A, the relay 60 remains deenergized until sufficient current has passed through the thermal winding 59 to cause the thermally responsive contacts 64—64*a* to open, thereby breaking the shunt circuit. After the shunt circuit is broken, the relay 60 becomes reenergized and attracts its armatures 61 and 62 thereby breaking the feedback circuit and terminating the interval of self-oscillation in the repeater circuit. The thermal relays T in different ones of the repeater circuits 4 may be adjusted for different periods of delay, thereby causing the respective repeater circuits to oscillate for different intervals as discussed with reference to the magnetic type relay 49 of Fig. 2A.

Fig. 2C of the drawings shows a modified form of the circuit of Fig. 2B which may be substituted for the relay circuit R in Fig. 2A. In order to prevent any possibility of premature operation of the magnetic relay, which must operate unfailingly when the shunt path is opened, but which should not pull the armatures away from their back contacts while shunted, the magnetic relay is provided with what is known in the art as a "bucking" winding connected in parallel with the shunting thermal relay.

Referring to Fig. 2C, the magnetic relay 66 is provided with a pair of windings disposed to produce opposing fields when connected as shown. These comprise an energizing winding 68, and a so-called "bucking" winding 67 which comprises a number of turns designed to neutralize the magnetic effect produced by the winding 68. The energizing winding 68 of the relay 66 is connected in series with the heater circuits 48 of Fig. 2A by direct connection between the junction $J_2$, which corresponds to the junction J of Fig. 2A, and the junction 72. When the relay 66 is energized, the armatures 69 and 70 are responsive thereto to break their respective contacts 69*a* and 70*a*. The armature and contact 70—70*a* serve to connect the junction $J_2$ to the repeater feedback circuit which has been described with reference to the previous figures. The armature and contacts 69—69*a* serve to connect the junction $J_2$ to the junction 72 through a shunt circuit which includes the contacts 74—74*a* of the thermal relay $T_1$ in series with a parallel circuit which comprises the winding 73 of the thermal relay $T_1$ and the "bucking" winding 67. The thermal relay $T_1$ is similar to the thermal relay T described with reference to Fig. 2A. The "bucking" winding 67 should have a high enough resistance to permit sufficient current to flow into the thermal winding 73 to operate the contacts 74—74*a* after the desired predetermined period. A condenser 74 may be connected across the thermal relay contacts 74—74*a* as described hereinbefore.

During normal operation of the energizing circuit of Fig. 1A, the relay 66 is energized by current flowing in the winding 68, thereby attracting its armatures 69 and 70 causing both the feedback and shunt circuits to be disconnected. An interruption in the energizing current by means of the terminal switches 11 and 12 of Fig. 1A causes the relay 66 to release its armature 70 to engage the contact 70*a* establishing the feedback circuit hereinbefore discussed; and releasing its armature 69 to engage the contact 69*a*, thereby shunting the energizing winging 68 through a circuit which includes the thermal relay $T_1$ and the "bucking" winding 67. After the energizing current is restored in the system of Fig. 1A, this shunt is maintained for the duration of the period required for the thermal contacts 74—74*a* to open, at which time the armatures 69 and 70 are disengaged from their respective contacts as described hereinbefore, and self-oscillation in the respective repeater ceases.

Figure 2D:
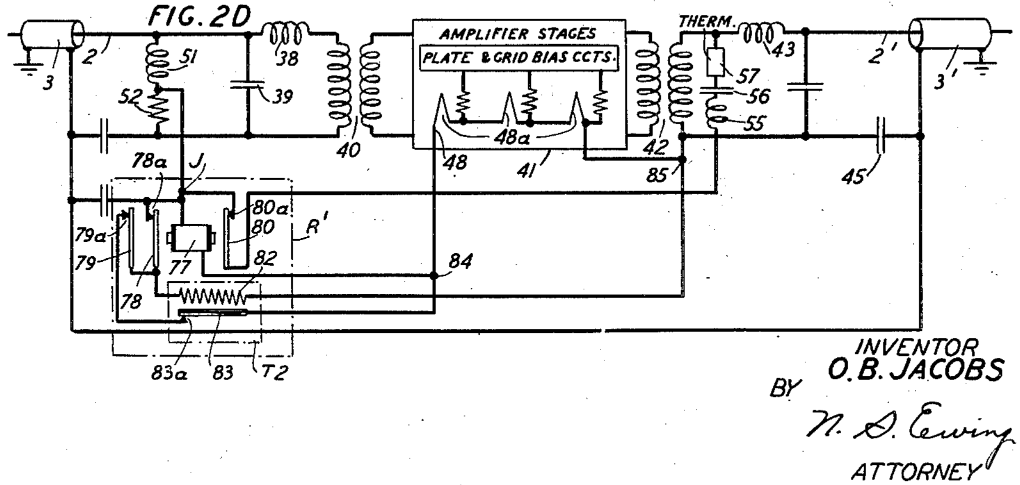
Fig. 2D shows one of the repeater circuits 4 of Fig. 1A including another modification of the relay circuit R of Fig. 2B, in which the magnetic relay is adapted to be short-circuited while the shunting contacts of a thermal relay are in operation.

Another arrangement of the relay circuit R is shown in Fig. 2D in which the magnetic relay is short-circuited during the time required for the contacts of a thermal relay to open, thereby providing against premature operation of the magnetic relay.

Referring to Fig. 2D, with the exception of the relay circuit R', which will be described, the elements are substantially identical to the like-numbered elements of Fig. 2A. The non-polar magnetic relay 77 comprises an energizing winding connected directly between the junction J and the junction 84, whereby it is disposed in series with the cathode heater circuits 48. Responsive to break their respective contacts when the relay 77 is energized, are the right-hand armature 80, the left-hand inside armature 78 and the left-hand outside armature 79. The armature 80 and contact 80*a* serve to connect a feedback circuit including the inductance 55, the condenser 56, and the thermistor 57 in series to the junction J, such as described with reference to previous figures. The armature 78 and contact 78*a* serve to connect a circuit to drive the thermal relay $T_2$, which is substantially similar to the thermal relay T described hereinbefore. This circuit includes the thermal winding 82 of the relay $T_2$, which is connected to the junction 85 at the low potential terminal of the secondary coil of the output transformer 42, providing a shunt circuit which draws a small amount of current from the circuit of the cathode heaters 48. The armature 79 and contact 79*a* serve to short-circuit the windings of the relay 77 by bringing junctions J and 84 to substantially the same potential through the low resistance contacts 83—83*a* of the thermal relay $T_2$.

In the normal operation of the system of Fig. 1A, the relay 77 is energized, attracting the armatures 78, 79, and 80, and disconnecting the shunt and feedback circuits. When the repeater energizing current is interrupted as described hereinbefore, the relay 77 becomes deenergized, thereby releasing its armatures 78, 79, and 80 to make their respective contacts. The armature 80 and contact 80*a* connect the feedback circuit to produce oscillation in the repeater, as hereinbefore described. The armature 78 and contact 78*a* connect the heating coil 82 in shunt with the heater circuits 48. Inasmuch as the amount of current diverted from the heaters 48 should be small, the amount of the energizing current in the cable system may be increased slightly, for example, 10 milliamperes above normal when initiating a test condition. Assuming, for example, that at a particular repeater 15 milliamperes current were diverted from the circuit of the heaters 48 to pass through the thermal winding 82, and that the total potential drop across the heater circuits is 60 volts, approximately 0.9 of a watt would be available to operate the heating coil 82 of the thermal relay $T_2$. The armature 79 and contact 79*a* would close the short circuit around the winding of the relay 77, causing it to remain deenergized until current passes through the winding 82 for a sufficient interval to cause the thermal contacts 83—83*a* to open, breaking the short circuit.

In all of the circuits described with reference to Figs. 2A–2D, neither the magnetic nor thermal relays have any "make" contacts; moreover, none of the relay contacts described are part of the normal repeater circuit. These factors considerably reduce the likelihood that the test circuits described would contribute unduly to the hazard of faults in the transmission system. The hazard of an open circuit in the windings of the relays may be minimized by connecting several windings in parallel.

It will be apparent to those skilled in the art that the present invention can be applied to types of communication system supplied with power from one or more distant attended points, other than the particular type of communication system described herein by way of illustration. Moreover, even in the case of unattended repeater stations in which power is supplied locally, control circuits between such stations and attended points could be arranged to establish a condition of oscillation on individual circuits for testing purposes, and thus employ to advantage certain features of the invention hereinbefore described.

What is claimed is:

1. A repeatered electrical transmission system, comprising in combination a source of energizing current for the repeaters of said system, means for varying the current from said source to produce a signal, normally disconnected oscillatory circuits at each of a plurality of said repeaters, relay means located at each of the repeaters of said plurality, each of said relay means including delayed release devices adjusted to release after intervals of different length in each of said respective repeater circuits, said relay means responsive to said signal to connect said respective oscillatory circuits into said respective repeater circuits whereby each of the repeaters of said plurality is caused to oscillate for a respectively different length of time, and means included in said system at a point remote from said repeaters to selectively receive said oscillations as a measure of the performance of said respective repeaters.

2. A repeatered electrical transmission system, comprising in combination a source of energizing current for the repeaters of said system, means for varying the current from said source to produce a signal, differently tuned normally disconnected oscillatory circuits at each of a plurality of said repeaters, relay means located at each of the repeaters of said plurality, said relay means including delayed release devices adjusted to release after intervals of different length in each of said respective repeater circuits, said relay means responsive to said signal to connect said respective tuned oscillatory circuits into said respective repeater circuits whereby each of the repeaters of said plurality is caused to oscillate at a respectively different frequency and for a respectively different length of time, and means included in said system at a point remote from said repeaters to detect and register said oscillations as a measure of the performance of said respective repeaters.

3. A repeatered electrical transmission system, comprising in combination a source of energizing current for the repeaters of said system located at one of the control stations of said system, means for varying the current from said source to produce a signal, feedback circuits at each of a plurality of said repeaters having respectively different electrical transmission characteristics, relay means located at each of the repeaters of said plurality, said relay means responsive to said signal to connect each of said different feedback circuits into said respective repeater circuits whereby each of said repeaters produces oscillations of different character, and means at one of the control stations of said system to detect and register said different character oscillations as a measure of the performance of said respective repeaters.

4. A repeatered electrical transmission system, comprising in combination a source of energizing current for the repeaters of said system located at one of the terminals of said system, means comprising a switch connected to said source to interrupt and restore the current from said source, differently tuned feedback circuits at each of a plurality of repeaters, relay means located at each of the repeaters of said plurality, said respective relay means comprising delayed acting elements constructed and arranged to function after respectively different periods of delay, and said relay means responsive to said interruption to respectively connect each of said tuned feedback circuits into said respective repeater circuits whereby each of said repeaters is caused to transmit oscillations of respectively different frequency for respectively different lengths of time, and means connected to one of the terminals of said system to display the said different frequency oscillations as a measure of the performance of said respective repeaters.

5. A system in accordance with claim 4 in which said relay means comprising delayed acting elements at each of the repeaters of said plurality comprise a magnetic relay and a thermal relay connected in circuit relation with said magnetic relay.

6. A long distance signal transmission system comprising sending and receiving terminal stations, a signal transmission line connecting said stations and including a multiplicity of unattended signal repeaters at intervals therein, each of said repeaters including means for conditioning the said repeaters to generate oscillations of limited amplitude and predetermined frequency and duration, said conditioning means including relay means having delayed acting elements constructed to establish the oscillating condition in the respective repeaters for correspondingly different time durations, current-controlled means at each of said repeaters for actuating said conditioning means, current-controlling means at a terminal station for operating said actuating means substantially simultaneously, and means at the receiving terminal station for receiving and registering the oscillations generated by the several repeaters.

7. A long distance signal transmission system comprising sending and receiving terminal stations, a signal transmission line connecting said stations and including a multiplicity of unattended signal repeaters at intervals therein, each of said repeaters including means for conditioning the said repeaters to generate oscillations of limited amplitude and predetermined frequency and duration, current-controlled means at each of said repeaters for actuating said conditioning means, current-controlling means at a terminal station for operating said actuating means substantially simultaneously, the said conditioning means each comprising relays having delayed release elements constructed to operate at different times after the operation of the actuating means whereby the oscillations begin at different times in the different repeaters, and means at the receiving terminal station for receiving and registering the oscillations generated by the several repeaters.

8. An electrical transmission system including a multiplicity of unattended repeaters at intervals therein, said system comprising in combination a source of energizing current for the repeaters of said system, means for momentarily interrupting the energizing current from said source to produce a signal, means comprising a circuit in each of said repeaters responsive to the interruption in said energizing current to establish oscillations in the said repeater for a predetermined interval following said interruption.

9. An electrical transmission system including a multiplicity of unattended repeaters at intervals therein, said system comprising in combination a source of energizing current for the repeaters of said system, means for momentarily interrupting the energizing current from said source to produce a signal, each of said repeaters including means for conditioning the said repeaters to generate oscillations of limited amplitude and predetermined frequency and duration, current-controlled means at each of said repeaters responsive to said signal for actuating said conditioning means for a different predetermined interval in each of said repeaters, following said momentary interruption.

OLIVER B. JACOBS.

REFERENCES CITED

The following references are of record in the file of this patent:

UNITED STATES PATENTS

| Number | Name | Date |
|---|---|---|
| 1,677,967 | Holden | July 24, 1928 |
| 2,066,333 | Caruthers | Jan. 5, 1937 |
| 2,083,666 | Potter | June 15, 1937 |
| 2,208,417 | Gilbert | July 16, 1940 |
| 2,260,160 | Benning | Oct. 21, 1941 |
| 2,315,434 | Leibe | Mar. 30, 1943 |
| 2,321,723 | Zinn | June 15, 1943 |
| 2,396,439 | Schlesinger | Mar. 12, 1946 |
| 2,509,365 | Parmentier | May 30, 1950 |

FOREIGN PATENTS

| Number | Country | Date |
|---|---|---|
| 23,397/35 | Australia | July 2, 1936 |